(12) United States Patent
Sivaram

(10) Patent No.: US 7,457,927 B2
(45) Date of Patent: Nov. 25, 2008

(54) MEMORY DUMP OF A COMPUTER SYSTEM

(75) Inventor: Rajini Sivaram, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 431 days.

(21) Appl. No.: 10/851,977

(22) Filed: May 20, 2004

(65) Prior Publication Data

US 2005/0120162 A1     Jun. 2, 2005

(30) Foreign Application Priority Data

Nov. 27, 2003    (GB)   ................................. 0327571.6

(51) Int. Cl.
     *G06F 12/16*      (2006.01)
     *G06F 17/30*      (2006.01)

(52) U.S. Cl. ...................... 711/162; 707/100

(58) Field of Classification Search .................. None
See application file for complete search history.

(56) References Cited

U.S. PATENT DOCUMENTS

| 5,999,933 | A   | * | 12/1999 | Mehta ........................ 707/100 |
| 6,385,664 | B1  | * | 5/2002  | Drees ......................... 719/331 |
| 6,792,559 | B1  | * | 9/2004  | Cohen et al. ................... 714/15 |
| 7,028,056 | B1  | * | 4/2006  | Hendel et al. ................ 707/202 |
| 7,047,447 | B2  | * | 5/2006  | Cantrill ....................... 714/38 |

\* cited by examiner

*Primary Examiner*—Gary J Portka
(74) *Attorney, Agent, or Firm*—Duke W. Yee; Herman Rodriguez; Peter B. Manzo

(57) ABSTRACT

A memory dump of a memory of a computer system having a first set of bytes and a second set of bytes. The first set of bytes includes application data, and the second set of bytes includes a description of a structure of the application data. The memory dump is read by locating the description of a structure of application data; reading the description; defining a runtime data structure in accordance with the description; locating the application data in the memory dump; and reading the application data into the runtime data structure.

13 Claims, 11 Drawing Sheets

MEMORY DUMP OF A COMPUTER SYSTEM

FIELD OF THE INVENTION

This invention relates to a memory dump of a computer system. In particular it relates to a description of application data which is included in a memory dump of a computer system.

BACKGROUND OF THE INVENTION

In a software application in execution application data is stored in a memory of a computer system in accordance with program instructions written by a software developer. FIG. 1a illustrates an exemplary configuration of a memory of a computer system for the storage of a data structure. The memory 102 is organised as a sequential list of memory locations each including a byte of storage 104 and a memory address 106. The memory address 106 of a memory location is a unique identifier of the memory location. Memory addresses 106 are numbered sequentially for the memory 102 in the computer system. A software application allocates one or more blocks of memory (such as memory blocks 108 and 110) for the storage of application data, where a block of memory comprises one or more contiguous memory locations. The size of a block of memory is determined by the type of data to be stored in the memory 102 and the architecture of the computer system. For example, the storage of an integer number field in memory 102 may occupy more than one memory location (i.e. more than one byte). Application data fields can be allocated and referenced in the memory 102 by low level machine instructions such as machine code.

Using high level programming languages such as "C" or "C++", the allocation of, and reference to, memory for application data is simplified by using data structures. A data structure is a definition of a unit of application data and can include data fields and other, nested, data structures. By way of example, FIG. 1a includes a representation of a data structure 112 defined in a high level programming language, including a first integer field 114 and a second integer field 116. The data structure 112 includes a name 118 which is used to refer to the entire data structure 112. Also, the first and second data fields 114 and 116 include names 120 and 122 respectively which are used by a software application in a high level language to reference the fields within the data structure. The data structure 112 is used by a software application written in a high level programming language to allocate a block of memory of sufficient size to store data corresponding to all of the fields of the data structure 112, and to refer to the fields within the data structure 112. Such a data structure can be defined in a header file of an application (known as a ".h" file).

FIG. 1a further illustrates how the data structure 112 is stored in the memory 102 during application runtime. In the particular example of FIG. 1a, the integer fields 114 and 116 each occupy four bytes of memory (i.e. four memory locations) when stored in the memory 102. A first block of memory 108 corresponds to the first data field 114, and a second block of memory 110 corresponds to the second data field 116. When stored in the memory 102, the data structure 112 can be referenced using a data structure memory address 124. The data structure memory address 124 is a memory address of a first memory location in the first block of memory 108. The data structure memory address 124 is the address of a first memory location in the memory 102 corresponding to the data structure 112. Each of the individual data fields 114 and 116 of the data structure 112 can be referenced as a block of data at a particular "offset" from the data structure memory address 124, and of a particular size. Thus the first field 114, which is stored in the block of memory 108, is referenced as follows:

ADDRESS: data structure memory address 124+ offset of zero bytes

SIZE: four bytes

Similarly the second field 116, which is stored in the block of memory 110, is referenced as follows:

ADDRESS: data structure memory address 124+ offset of four bytes

SIZE: four bytes

Thus FIG. 1a illustrates how application data is stored in the memory 102 of the computer system, and how the application data can be allocated and referenced by both an application in a high level language and low level machine instructions.

Prior to executing a software application written in a high level programming language, it is necessary to convert the software application to low level machine instructions. The conversion of the software application to low level machine instructions can be performed by a compiler, such as a "C" compiler, or a runtime interpreter, and includes the conversion of high level instructions for the allocation and reference of data structures to low level memory allocations and memory references.

FIG. 1b is a block diagram illustrating the processes involved in compiling a software application which is written in a high level programming language, and which generates a memory dump at runtime. An application executable 130 is compiled from source files 132 and a header file 136 using a compiler 138. The application executable 130 is a binary file containing instructions which are executable on a first computer system 140. At runtime, the application executable 130 is loaded as an application runtime 144 into a memory 142 of the first computer system 140. Application runtime 144 executes using a processor of the first computer system 140 (not shown). Application runtime 144 allocates memory 142 for the storage of application data 146.

Source files 132 contain application source instructions written in a high level programming language such as "C". Header file 136 supplements source files 132 and includes data structure definitions 148. The data structure definitions 148 are used by the source instructions in the source files 132 to define how application data 146 is allocated and referenced by application runtime 144. An example data structure 150 is illustrated and includes data fields 152, such as numeric or memory pointer fields. Data structure 150 also includes a data structure "eyecatcher" field 151 which is explained below later.

The compiler 138 processes the source files 132 and the header file 136 to generate the application executable 130. During compilation, the compiler 138 converts high level instructions for the allocation of, and reference to, data structure 150 into low level machine instructions for the allocation of, and reference to, memory 142. The low level machine instructions are stored in the application executable 130. The conversion to low level machine instructions involves generating low level memory allocation instructions for allocating blocks of memory 142 at runtime. Such low level allocation instructions provide a memory address for each block of memory allocated in memory 142. Also, the compiler calculates, for each of the fields 152 of data structure 150, an offset from a memory address of a block of allocated memory and a size of the field. Thus, where a reference is made in the source files 132 to one of the fields 152 in the data structure 150, a corresponding reference is generated in the application executable 130 using an offset and size corresponding to the field. In this way, high level source instructions in source files 132 are converted to low level machine instructions in application executable 130 for the allocation of, and reference to, data structure 150.

At runtime, application executable 130 is loaded into memory 142 for execution as application runtime 144. Application data 146 is stored in memory 142 by application runtime 144 using the low level machine instructions generated by compiler 138. The first computer system 140 is configured to generate a dump file 162. Dump file 162 can be generated in response to a request by a user of the first computer system 140, or alternatively in response to a problem in the execution of application runtime 144 such as an unrecoverable error. The dump file 162 is a binary file containing a sequential list of bytes 164, where each byte corresponds to one byte in memory 142 at the particular time when the dump file 162 was generated. The dump file 162 also contains a base memory address 165 representing a base address in the memory 142 from which the sequential list of bytes 164 originates. Thus, using the base memory address 165 and an offset of a particular byte in the dump file 162 from the beginning of the list of bytes 164, it is possible to determine the memory address in memory 142 from which the particular byte originates. Alternatively, the dump file 162 may include a runtime memory address for each byte in the list of bytes 164. Thus, dump file 162 is considered to be a snap-shot of all, or a subset of, the memory 142. Alternatively, the dump file 162 can be a memory dump stored in the memory of the first computer system 140.

Dump file 162 can be used for the analysis of the memory 142 during or after execution of application runtime 144. In particular, it is useful to identify a series of bytes within dump file 162 which correspond to application data 146 in order to determine a particular operating state of application runtime 144 when the dump file 162 was generated. For example, it is useful to identify a series of bytes within dump file 162 which correspond to the fields 152 of data structure 150. However, it is difficult to identify such a series of bytes because there is usually no way to determine which bytes in the dump file 162 correspond to the fields 152 of data structure 150.

One way to aid the identification of bytes in dump file 162 corresponding to the fields 152 of data structure 150 is to use a data structure eyecatcher field 151 within data structure 150. The data structure eyecatcher field 151 has a particular defined value and can be placed as a first field within the data structure 150. Then, when analysing the dump file 162, searching for the particular defined value of the data structure eyecatcher field 151 will identify the first of a series of bytes within dump file 162 corresponding to the fields 152 of data structure 150. The data structure eyecatcher field 151 can be used by a dump file analysis tool 168 executing on a second computer system 170. Alternatively, the dump file analysis tool 168 can execute on the first computer system 140 on which application runtime 144 executes. The dump file analysis tool 168 is able to read the dump file 162 and identify a data structure eyecatcher field 151 corresponding to data structure 150. However, once a series of bytes corresponding to data structure 150 has been identified, it is then necessary for the dump file analysis tool 168 to determine the location of the each of the fields 152 of the data structure 150. This entails the calculation of offsets and sizes for the fields 152 of data structure 150, such as offset 172 and size 174. In order to calculate offset 172 and size 174, the dump file analysis tool 168 must have access to the definition of data structure 150 from header file 136. Thus, with the header file 136 and the provision of a data structure eyecatcher field 151 within data structure 150, dump file analysis tool 168 is able to determine the location of a series of bytes within the dump file 162 corresponding to the fields 152 of data structure 150, and the particular location of each of the fields 152.

There are significant drawbacks to this approach for analysing the dump file 162. Firstly, it is necessary to use the header file 136 to calculate the offset 172 and size 174 of each of the fields 152 of data structure 150. This will not be possible in an environment where the header file 136 is not available, such as when an application is executing in a production computer system where only application executable 130 in binary format is available. Secondly, the offset 172 and size 174 may only be valid for the data structure 150 in a particular version of the application. If the definition of data structure 150 is changed in a second version of the application, an offset 172 and size 174 for each of the fields 152 must be recalculated in accordance with the new definition of data structure 150. Thus, offset 172 and size 174 are version specific. Thirdly, the calculation of offset 172 and size 174 must be undertaken on a computer system which is architecturally compatible with computer system on which the application runtime 144 is executing. This is due to the possibility that the definition of data types can differ between computer systems of different architectures. For example, the PowerPC 32-bit architecture (known as PPC32) (PowerPC is a registered trade mark of International Business Machines Corporation) defines a memory pointer data field as occupying four bytes of memory. In contrast, the PowerPC 64-bit architecture (known as PPC64) defines a memory pointer data field as occupying eight bytes of memory. Thus, if the first computer system 140 has an PPC32 architecture, a memory pointer field in the fields 152 of data structure 150 would correspond to four bytes within application data 146. On subsequent generation of the dump file 162, such a memory pointer field would occupy four bytes of dump file 162. If the second computer system 170 has an PPC64 architecture, the memory pointer field within the dump file 162 would be erroneously considered to correspond to eight bytes by the dump file analysis tool 168 running on the second computer system 170. Thus, the dump file analysis tool 168 calculates an incorrect offset 172 and/or size 174 for a memory pointer field of data structure 150 when the architecture of computer system 170 differs from that of computer system 140. It is therefore necessary to execute the dump file analysis tool 168 on a second computer system 170 with the same architecture as that of the first computer system 140, or alternatively to execute the dump file analysis tool 168 on the first computer system 140.

These drawbacks prevent the development of a generic dump file analysis tool which can execute on any architecture of computer system 170 for any version of an application runtime 144, and without access to the header file 136. It would therefore be advantageous to provide a mechanism for such a generic dump file analysis tool to be developed.

SUMMARY OF THE INVENTION

Accordingly the present invention provides a method for generating a memory dump of a memory of a computer system, comprising the steps of: loading an application executable into the memory of the computer system for execution as an application runtime; the application runtime allocating memory of the computer system for the storage of application data; the application runtime loading a description of a structure of the application data into the memory of the computer system; and the computer system generating a memory dump of the memory of the computer system, said memory dump including the description and the application data.

According to a second aspect of the present invention there is provided a method for reading a memory dump of a memory of a computer system, comprising the steps of: locating a description of a structure of application data in the memory dump; reading said description; defining a runtime data structure in accordance with the description; locating application data in the memory dump; and reading said application data into said runtime data structure.

The memory dump includes a description of the application data and therefore a dump analysis tool is able to accurately interpret the application data using this description. The description is preferably provided in an platform independent format allowing the dump analysis tool to operate on a computer system with a different architecture to that of the computer system which generates the memory dump. The inclusion of a description of the application data within the memory dump itself removes the need for a dump analysis tool to have access to header files or other definitions of the application data. Consequently, a generic dump analysis tool can be developed to read the description of the application data in the memory dump prior to analysing the application data included in the memory dump.

According to a third aspect of the present invention there is provided a memory dump comprising a first plurality of bytes and a second plurality of bytes wherein said first plurality of bytes includes application data, and wherein said second plurality of bytes includes a description of a structure of said application data.

According to a fourth aspect of the present invention there is provided a means for generating a memory dump of a memory of a computer system, comprising: means for loading an application executable into the memory of the computer system for execution as an application runtime; means for the application runtime allocating memory of the computer system for the storage of application data; means for the application runtime loading a description of a structure of the application data into the memory of the computer system; and means for the computer system generating a memory dump of the memory of the computer system, said memory dump including the description and the application data.

According to a fifth aspect of the present invention there is provided a means for reading a memory dump of a memory of a computer system, comprising: means for locating a description of a structure of application data in the memory dump; means for reading said description; means for defining a runtime data structure in accordance with the description; means for locating application data in the memory dump; and means for reading said application data into said runtime data structure.

According to a sixth aspect of the present invention there is provided a computer program product comprising computer program code stored on a computer readable storage medium which, when executed on a data processing system, instructs the data processing system to carry out the method for generating a memory dump of a memory of a computer system described above.

According to a seventh aspect of the present invention there is provided a computer program product comprising computer program code stored on a computer readable storage medium which, when executed on a data processing system, instructs the data processing system to carry out the method for reading a memory dump of a memory of a computer system described above.

BRIEF DESCRIPTION OF THE DRAWINGS

Preferred embodiments of the present invention will now be described in detail by way of example only with reference to the following drawings.

DETAILED DESCRIPTION OF THE PREFERRED EMBODIMENT

Figure 1A:
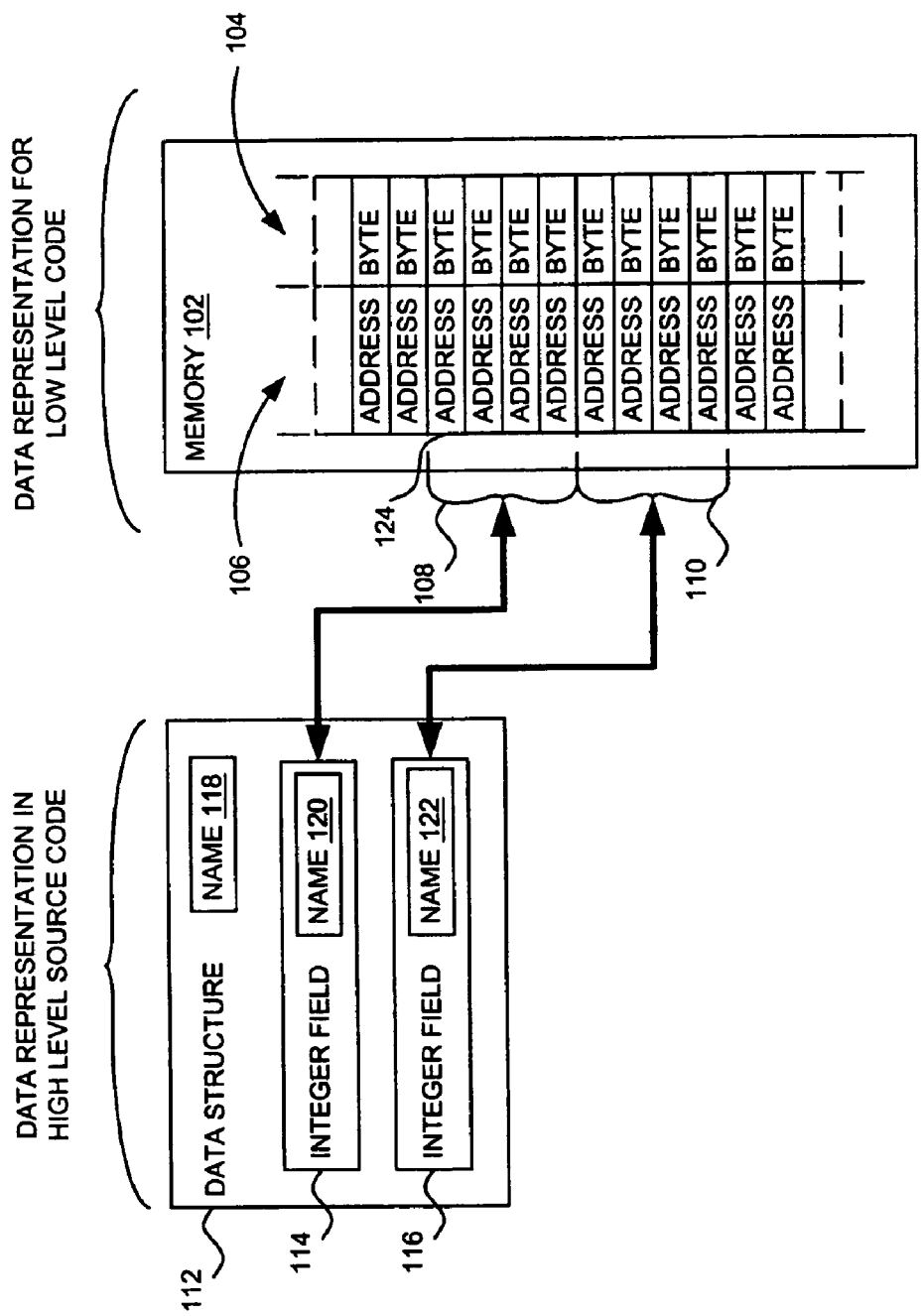
FIG. 1a illustrates an exemplary configuration of a memory of a computer system for the storage of a data structure in the prior art.
Figure 1B:
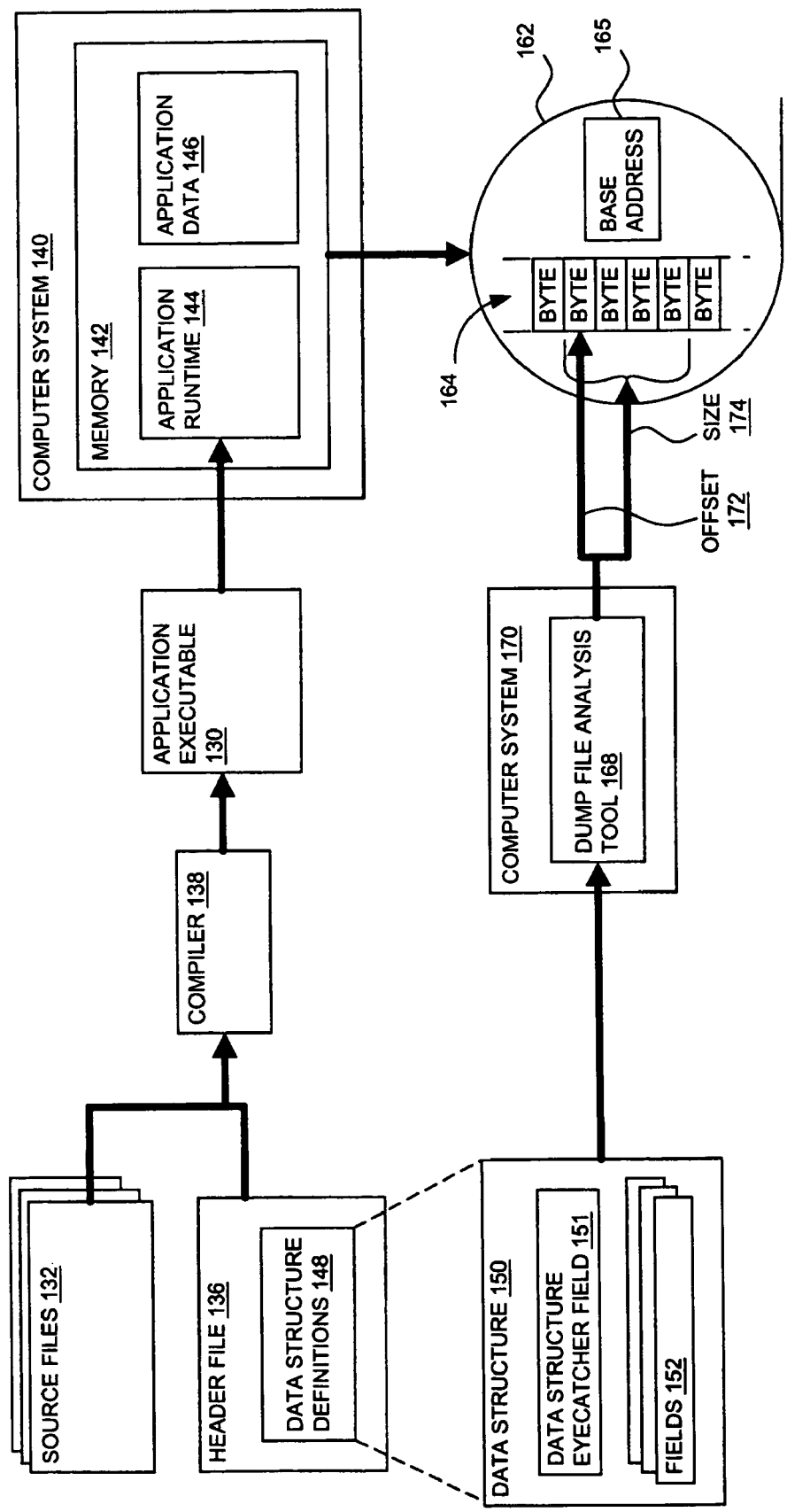
FIG. 1b is a block diagram illustrating the processes involved in compiling a software application which is written in a high level programming language, and which generates a memory dump at runtime in the prior art.
Figure 2:
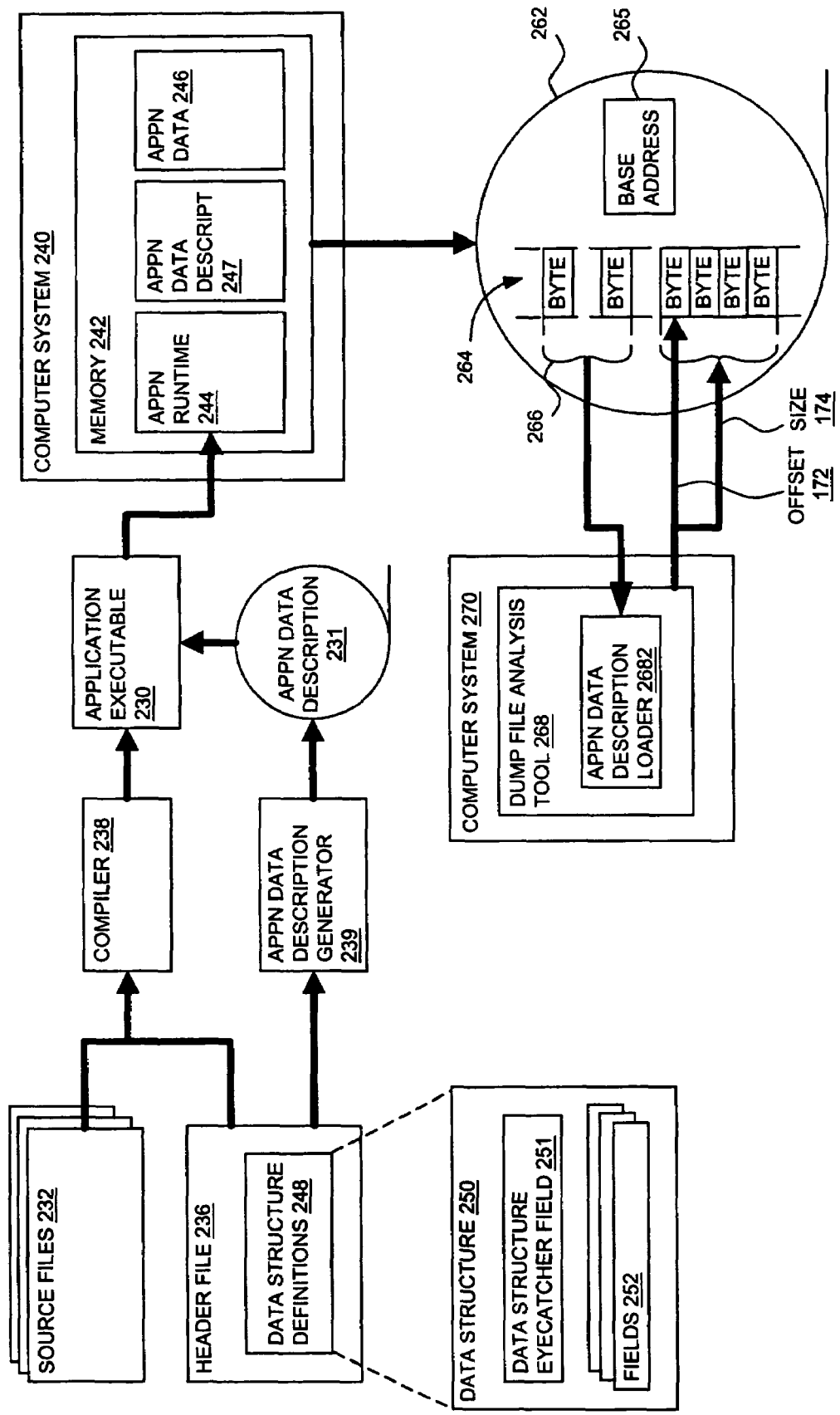
FIG. 2 is a block diagram illustrating the processes involved in compiling a software application which is written in a high level programming language, and which generates a memory dump file at runtime, in accordance with a preferred embodiment of the present invention.

FIG. 2 is a block diagram illustrating the processes involved in compiling a software application which is written in a high level programming language, and which generates a memory dump file at runtime, in accordance with a preferred embodiment of the present invention. Many elements of FIG. 2 are identical to those described with respect to FIG. 1b and these will not be repeated here in the description of FIG. 2. In addition to the elements described with respect to FIG. 1b, FIG. 2 includes an application data description generator 239. The application data description generator 239 takes as input the header file 236 and generates an application data description file 231. The application data description file 231 is a binary file including a platform independent description of the data structure definitions 248 within the header file 236. The application data description file 231 is platform independent so that it can be accurately read by an application running on a computer system regardless of the architecture of the computer system. In order to ensure the application data description file 231 is platform independent, a standard structure of the application data description file 231 can be defined for use by the application data description generator 239 and by any application which reads the application data description file 231. For example, the standard structure definition of the application data description file 231 can determine that numerical values stored within the application data description file 231 will always be stored in four bytes of the application data description file 231. The application data description file 231 also describes the data structure definitions 248 in a platform independent way, using similar techniques.

Alternatively, the application data description generator 239 can generate a version of the application executable 230 with debug information. Such a debug version of an application executable is well known in the art and can be generated, for example, by using the '-g' option of a Unix "gcc" compiler (Unix is a registered trade mark of The Open Group). A version of the application executable 230 with debug information contains a description of the data structure definitions 248. The application data description generator 239 can subsequently use the application executable 230 with debug information to generate the application data description file 231.

The application executable 230 of FIG. 2 differs from that of FIG. 1b in that the application executable 230 includes instructions to load the application data description file 231 into the memory 242 of the first computer system 240 at runtime. Thus, in execution, the application executable 230 is loaded into the memory 242 as application runtime 244. The application runtime 244 subsequently loads the application data description file 231 into the memory 242 as application data description 247. The application data description 247 stored in memory 242 retains a platform independent structure. Further the application runtime 244 allocates memory 242 for the storage of application data 246.

Thus, in execution, the application data description is stored within the memory 242 of the first computer system 240 and consequently, on generation of the dump file 262, the application description 247 is stored in the sequential list of bytes 264 within the dump file 262. A range of bytes 266 corresponds to the application data description 247. Subsequently, an application data description loader 2682 within the dump file analysis tool 268 is able to identify and read the range of bytes 266 corresponding to the application data description 247. The application data description loader 2682 can use an application data description eyecatcher field within the application data description 247 to identify the location of the range of bytes 266 corresponding to the application data description 247 within the sequential list of bytes 264. The dump file analysis tool 268 is then able to generate runtime data structures in accordance with the application data description 247 contained within the range of bytes 266 of the dump file 262. Subsequently, dump file analysis tool 268 identifies and reads bytes in the sequential list of bytes 264 corresponding to application data 246. Dump file analysis tool 268 uses the data structure eye catcher field 251 to identify the location of application data within the sequential list of bytes 264. The runtime data structures are used by the dump file analysis tool 270 to generate application data 246 in a memory of the second computer system 270 as read from the sequence of bytes 264 within the dump file 262.

In this way, the dump file analysis tool 268 is able to accurately interpret application data 246 stored in the sequential list of bytes 264 within the dump file 262. The dump file analysis tool 268 does not need to refer to the header file 236 because a description of the application data is included in the dump file 262 in the range of bytes 266. Furthermore, the application data description 247 stored in the range of bytes 266 is platform independent and so can be read by the dump file analysis tool 268 irrespective of the architecture of the second computer system 270. Also, the application data description 247 stored in the range of bytes 266 describes the data structure definitions 248 in a platform independent manner, so the application data 246 stored in the sequential list of bytes 264 can also can be read by the dump file analysis tool 268 irrespective of the architecture of the second computer system 270.

Figure 3:
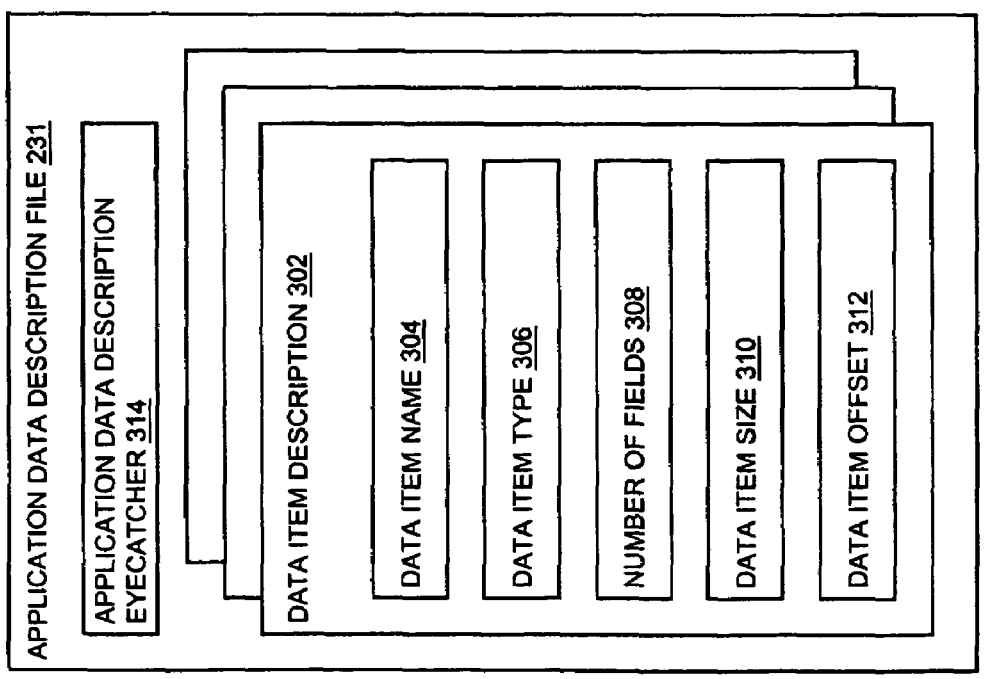
FIG. 3 is a schematic diagram illustrating an arrangement of the application data description file of FIG. 2 in a preferred embodiment of the present invention.

The processes of FIG. 2 will now be considered in use by way of example only. FIG. 3 is a schematic diagram illustrating an arrangement of the application data description file 231 of FIG. 2 in a preferred embodiment of the present invention. The application data description 247 is the application data description file 231 loaded into the memory 242 of the first computer system 240, and so the structure of the application data description file 231 illustrated in FIG. 3 and described hereinbelow also corresponds to the structure of the application data description 247. The application data description file 231 is used to describe all data structures (e.g. data structure 250) and fields (e.g. fields 252) within the data structure definitions 248, and includes a data description eyecatcher 314 and one or more data item descriptions 302. The data description eyecatcher 314 has a particular defined value which can be used to identify the application data description file 231 when the application data description file 231 is loaded into the memory 242 as application data description 247 and subsequently included in the dump file 262. Each of the data item descriptions 302 is a description of a single data item defined in the data structure definitions 248 of the header file 236. A data item is a single field within a data structure (e.g. a single one of the fields 252 within the data structure 250) or a data structure itself (e.g. data structure 250). Each data item description 302 includes, for a single data item: a data item name 304; a data item type 306; a number of fields 308; a data item size 310; and a data item offset 312. These elements of a data item description 302 are explained below.

The data item name 304 is a character representation of a name of the data item. For example, the data item name 304 can be the name of one of the fields 252 within the data structure 250. The data item name 304 can correspond to a name used in source files 232 and header file 236 to refer to the date item. The data item type 306 is a character representation of a name of a type of the data item. The data item type 306 can be specific to a particular high level programming language in which the data item is defined. For example, valid data item types in the "C" programming language include "int" (integer), "char" (character) and the use of an asterisk thus "*" to refer to a memory pointer to another data item type. E.g. "char *" refers to a memory pointer to a character. The number of fields 308 is a numeric value corresponding to a number of fields within a data structure data item. For example, for a data structure containing an integer numeric field and a memory pointer field, the number of fields 308 will have a value of "2". The number of fields 308 is set to "0" for data items which are not data structures, such as fields 252 within data structure 250. The data item size 310 is a numeric value corresponding to a size of the data item measured in bytes. The size of the data item can be determined by the architecture of the first computer system 240 on which the application executable 230 is compiled to execute. For example, if the first computer system 240 uses an PPC32 architecture, a memory pointer field (such as a "char *") will have a size of four bytes. Alternatively, the data item size 310 can be measured in bits to accommodate a data item which does not have a size which is a whole multiple of a byte, or is smaller than a byte in size (such as a bit field). The data item offset 312 is a numeric value corresponding to an offset of the data item from the beginning of a data structure containing the data item measured in bytes, if the data structure eyecatcher field 251 is the first field in the data structure 250, the data structure eyecatcher field 251 has an offset of zero bytes from the beginning of the data structure 250. Similarly, a second field in the data structure 250 has an offset from the beginning of data structure 250 equivalent to the size of the data structure eyecatcher field 251. The inclusion of the data item size 310 and data item offset 312 information in the data item description 302 ensures the application data description file 231 can be interpreted accurately by a computer system of any architecture, because the size and offset of each field is explicitly provided.

The arrangement of application data description 247 illustrated in FIG. 3 and described hereinbefore is by way of example only, and other arrangements for suitably describing data structure definitions 248 will be apparent to those skilled in the art.

The application data description file 231 is stored in a platform independent binary format such that it can be read and accurately interpreted by a computer system of any architecture. This is achieved by defining a standard structure of the application data description file 231 for use by the application data description generator 239. The standard structure can also be used by any application which reads the application data description file 231, the application data description 247 or the block of bytes 266 in the dump file corresponding to the application data description 247. An exemplary definition of a structure of a record for the application data description file 231 of FIG. 3 is provided in Table 1 below, with each record occupying forty-eight bytes:

TABLE 1

| APPLICATION DATA DESCRIPTION FILE 231 RECORD FIELD NAME | APPLICATION DATA DESCRIPTION FILE 231 RECORD FIELD DEFINITION |
|---|---|
| DATA ITEM NAME 304 | 16 bytes (characters) |
| DATA ITEM TYPE 306 | 16 bytes (characters) |
| NUMBER OF FIELDS 308 | 4 bytes (numeric) |
| DATA ITEM SIZE 310 | 4 bytes (numeric) |
| DATA ITEM OFFSET 312 | 4 bytes (numeric) |
| RECORD NUMBER | 4 bytes (numeric) |

Each field in the application data description file 231 record defined in Table 1 is specified as a literal number of bytes as opposed to a platform dependent data type. For example, the data item size 310 field is defined as a four byte numeric as opposed to an "int". This avoids an architecturally dependent interpretation of each of the fields during the creation or reading of records. Also, a "RECORD NUMBER" field has been included in the record. This is simply a sequence number and is of no significance as it simply pads the record length to forty eight bytes for ease of representation.

Figure 4A:
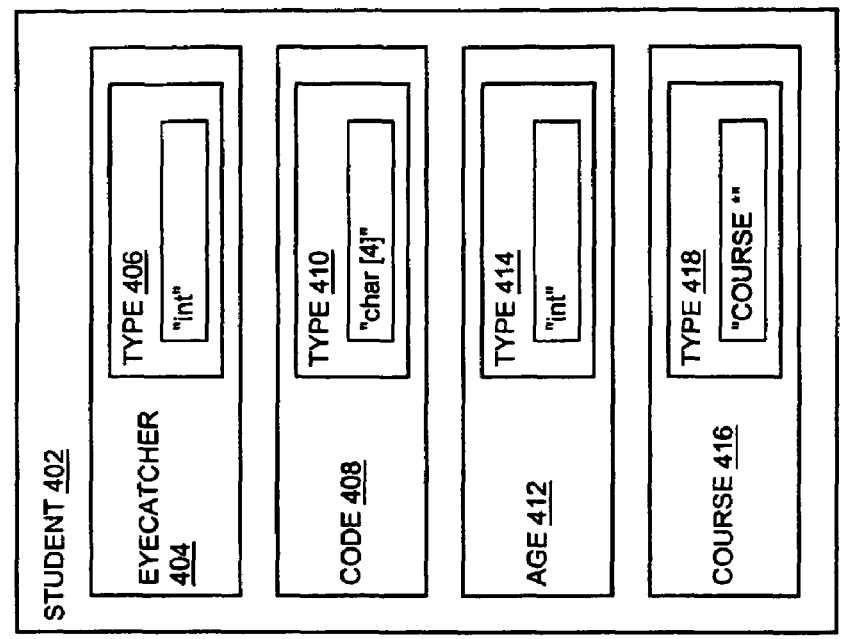
FIG. 4a is a schematic diagram illustrating an arrangement of an example "student" data structure defined in the data structure definitions of FIG. 2 in a preferred embodiment of the present invention.

Example data structures defined in the data structure definitions 248 of FIG. 2 will now be used to demonstrate how the application data description generator 239 can be employed to generate an application data description file 231 in accordance with the example record structure defined above. FIG. 4a is a schematic diagram illustrating an arrangement of an example "student" data structure defined in the data structure definitions 248 of FIG. 2 in a preferred embodiment of the present invention. The student data structure 402 includes a data structure eyecatcher field 404. The data structure eyecatcher field 404 has a data type 406 of "int", corresponding to an integer numeric. The student data structure 402 further includes a code field 408. The code field 408 has a data type 410 of "char [4]", corresponding to four bytes of character data. The student data structure 402 further includes an age field 412. The age field 412 has a data type 414 of "int". The student data structure 402 further includes a course field 416. The course field 416 has a data type 418 of "COURSE *", corresponding to a memory pointer to a course data structure (see below with respect to FIG. 4b). In the preferred embodiment, the student data structure 402 is defined to be used by the application runtime 244 on the first computer system 240, and the first computer system 240 has an PPC32 architecture. Thus, "int" fields have a size of four bytes and memory pointers have a size of four bytes.

Figure 4B:
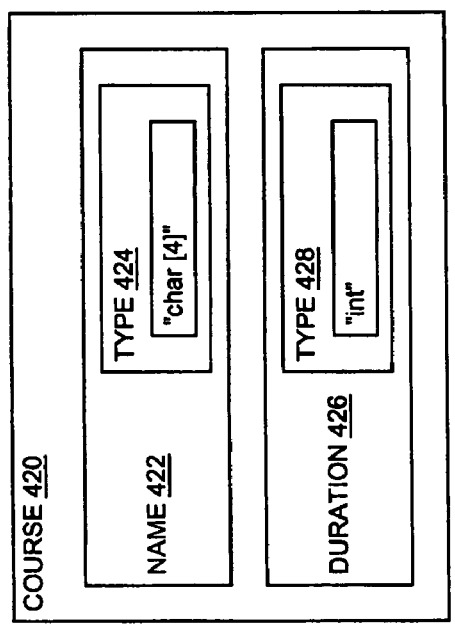
FIG. 4b is a schematic diagram illustrating an arrangement of an example "course" data structure defined in the data structure definitions of FIG. 2 in a preferred embodiment of the present invention.

FIG. 4b is a schematic diagram illustrating an arrangement of an example "course" data structure defined in the data structure definitions 248 of FIG. 2 in a preferred embodiment of the present invention. The course data structure 420 includes a name field 422. The name field 422 has a data type 424 of "char [4]", corresponding to four bytes of character data. The course data structure 420 further includes a duration field 426. The duration field has a data type 428 of "int". In the preferred embodiment, the course data structure 420 is defined to be used by the application runtime 244 on the first computer system 240, and the first computer system 240 has an PPC32 architecture. Thus, "int" fields have a size of four bytes.

Figure 5:
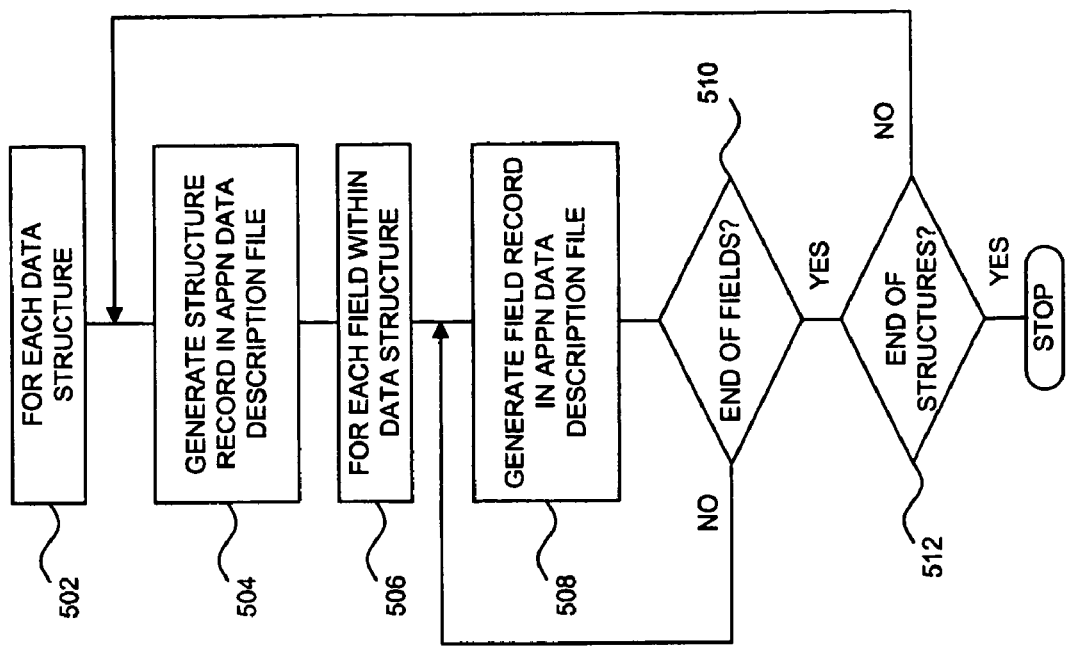
FIG. 5 is a flowchart illustrating a method of the application data description generator of FIG. 2 for the generation of the application description file in a preferred embodiment of the present invention.

Turning now to FIG. 5, a method of the application data description generator 239 of FIG. 2 is illustrated for the generation of the application description file 231 in a preferred embodiment of the present invention. FIG. 5 will be considered in view of the student data structure 402 and course data structure 420 of FIGS. 4a and 4b. At step 502, a loop is initiated through each data structure. Starting with the student data structure 402, at step 504 a record is written to the application data description file 231 for the student data structure 402. The application data description file 231 record for the student data structure 402 includes the field values in Table 2 below:

TABLE 2

| DATA ITEM NAME 304 | DATA ITEM TYPE 306 | NUMBER OF FIELDS 308 | DATA ITEM SIZE 310 | DATA ITEM OFFSET 312 | RECORD NUMBER |
|---|---|---|---|---|---|
| STUDENT | STRUCTURE | 4 | 16 | 0 | 1 |

Thus the record in the application data description file 231 for the student data structure 402 has a data item name 304 of "STUDENT" corresponding to the name of the student data structure 402. The student data structure 402 has a data item type 306 of "STRUCTURE", and the student data structure 402 has four fields indicated in the number of fields 308 field. The total size of the student data structure 402 is sixteen bytes (i.e. the sum of the size of each of the fields within the data structure). The student data structure 402 is not a field data item, and so the data item offset 312 is defined to be zero. Also, the record is assigned a record number of one.

Continuing at step 506, a loop is initiated through each of the fields within the student data structure 402. Starting with the data structure eyecatcher field 404, at step 508 a record is written to the application data description file 231 for the data structure eyecatcher field 404. The application data description file 231 record for the data structure eyecatcher field 404 includes the field values in Table 3 below:

TABLE 3

| DATA ITEM NAME 304 | DATA ITEM TYPE 306 | NUMBER OF FIELDS 308 | DATA ITEM SIZE 310 | DATA ITEM OFFSET 312 | RECORD NUMBER |
|---|---|---|---|---|---|
| EYECATCHER | int | 0 | 4 | 0 | 2 |

Thus the record in the application data description file 231 for the data structure eyecatcher field 404 has a data item name 304 of "EYECATCHER" corresponding to the name of the data structure eyecatcher field 404. The data structure eyecatcher field 404 has a data item type 306 of "int". The data structure eyecatcher field 404 is not a data structure in itself, and so the number of fields 308 is set to zero. The total size of the data structure eyecatcher field 404 is the size of an "int" data type on the first computer system 240 which has an PPC32 architecture, and is thus four bytes. The data structure eyecatcher field 404 is the first field in the student data structure 402 and so the data item offset 312 is defined to be zero. Also, the record is assigned a record number of two.

Continuing at step 510, the method determines that all fields for the student data structure 402 have not been processed and returns to step 508 for the next field in the student data structure 402. At step 508, for the code field 408 of the student data structure, a record is written to the application data description file 231 for the code field 408. The application data description file 231 record for the code field 408 includes the field values in Table 4 below:

data item offset 312 for the code field 408 is the size of the data structure eyecatcher field 404, which is four bytes. Also, the record is assigned a record number of three.

Continuing at step 510, the method determines that all fields for the student data structure 402 have not been processed and returns to step 508 for the next field in the student data structure 402. The method then continues to loop through steps 508 and 510 for the age field 412 and course field 416 of the student data structure 402 writing records to the application data description file 231. Following the loop through each field of the student data structure 402, the records in Table 5 below are written to the application data description.

TABLE 4

| DATA ITEM NAME 304 | DATA ITEM TYPE 306 | NUMBER OF FIELDS 308 | DATA ITEM SIZE 310 | DATA ITEM OFFSET 312 | RECORD NUMBER |
|---|---|---|---|---|---|
| CODE | char | 0 | 4 | 4 | 3 |

Thus the record in the application data description file 231 for the code field 408 has a data item name 304 of "CODE" corresponding to the name of the code field 408. The code field 408 has a data item type 306 of "char" corresponding to character data. The code field 408 is not a data structure in itself, and so the number of fields 308 is set to zero. The total size of the code field 408 is four bytes (because the code field 408 has the type 414 of "char [4]"). The code field 408 follows the data structure eyecatcher field 404 and is therefore displaced from the beginning of the student data structure 402 by the size of the data structure eyecatcher field 404. Thus, the

TABLE 5

| DATA ITEM NAME 304 | DATA ITEM TYPE 306 | NUMBER OF FIELDS 308 | DATA ITEM SIZE 310 | DATA ITEM OFFSET 312 | RECORD NUMBER |
|---|---|---|---|---|---|
| STUDENT | STRUCTURE | 4 | 16 | 0 | 1 |
| EYECATCHER | int | 0 | 4 | 0 | 2 |
| CODE | char | 0 | 4 | 4 | 3 |
| AGE | int | 0 | 4 | 8 | 4 |
| COURSE | COURSE* | 0 | 4 | 12 | 5 |

Subsequently, the method proceeds to step 512 and determines that one more data structure, the course data structure 420, is to be processed. The method returns to step 504 for the course data structure 420 and a record is written to the application data description file 231 for the course data structure 420. The application data description file 231 record for the course data structure 402 includes the field values in Table 6 below:

TABLE 6

| DATA ITEM NAME 304 | DATA ITEM TYPE 306 | NUMBER OF FIELDS 308 | DATA ITEM SIZE 310 | DATA ITEM OFFSET 312 | RECORD NUMBER |
|---|---|---|---|---|---|
| COURSE | STRUCTURE | 2 | 8 | 0 | 6 |

Thus the record in the application data description file 231 for the course data structure 420 has a data item name 304 of "COURSE" corresponding to the name of the course data structure 420. The course data structure 420 has a data item type 306 of "STRUCTURE", and the course data structure 420 has two fields indicated in the number of fields 308 field. The total size of the course data structure 420 is eight bytes (i.e. the sum of the size of each of the fields within the data structure). The course data structure 420 is not a field data item, and so the data item offset 312 is defined to be zero. Also, the record is assigned a record number of six.

Figure 6:
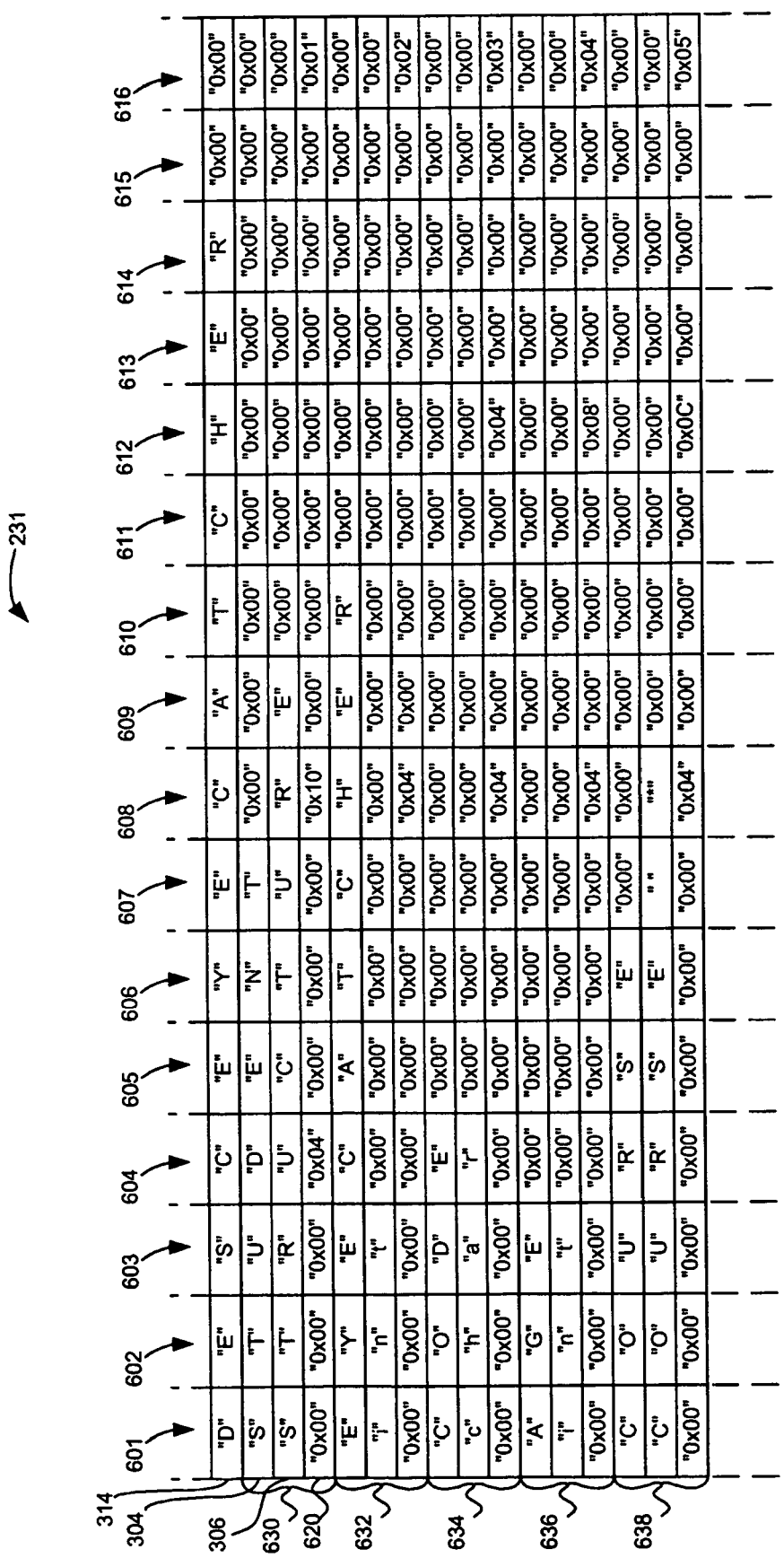
FIG. 6 is a diagram illustrating a segment of an application data description file in a preferred embodiment of the present invention.

Continuing at step 506, a loop is initiated through each of the fields within the course data structure 420. Within the loop, step 508 generates a record in the application data description file 231 for each field in the course data structure 420 in the same way as for the student data structure 402. Following the loop through each field of the course data structure 402, the records in Table 7 are written to the application data description file 231.

records of Table 8. For clarity and ease of reference, the segment of the application data description file 231 of FIG. 6 is arranged as a series of rows, each including sixteen bytes organised into columns 601 to 616. Thus, a single forty-eight byte record of the application data description file 231 occupies three rows of FIG. 3. The first sixteen bytes of the application data description file 231 is the application data description eyecatcher 314 in character form. The application data description eyecatcher 314 has the value "DESCEYE-CATCHER" and is used to identify the application data description file 231 when it is loaded into the memory 242 as application data description 247 and subsequently included in the dump file 262. The next forty-eight bytes of the application data description file 231 correspond to a first record 630 in the application data description file 231. In accordance with the structure of Table 1, the first record 630 includes a sixteen byte data item name 304 field with the value "STUDENT". The first record 630 also includes a sixteen byte data item type 306 field with the value "STRUCTURE". The first

TABLE 7

| DATA ITEM NAME 304 | DATA ITEM TYPE 306 | NUMBER OF FIELDS 308 | DATA ITEM SIZE 310 | DATA ITEM OFFSET 312 | RECORD NUMBER |
|---|---|---|---|---|---|
| COURSE | STRUCTURE | 2 | 8 | 0 | 6 |
| NAME | char | 0 | 4 | 0 | 7 |
| DURATION | int | 0 | 4 | 4 | 8 |

Subsequently, the method proceeds to step 512 and determines that there are no more data structures to be processed and the method terminates. In summary, the method of FIG. 5 generates an application data description file 231 with the records in Table 8 for the student data structure 402 and course data structure 420.

record 630 includes a further sixteen bytes indicated at row 620. Row 620 is divided as follows: a first four byte field ranging from columns 601 to 604 corresponding to the number of fields 308, with the value "4" represented in hexadecimal notation ("0x00000004"); a second four byte field ranging from columns 605 to 608 corresponding to the data item

TABLE 8

| DATA ITEM NAME 304 | DATA ITEM TYPE 306 | NUMBER OF FIELDS 308 | DATA ITEM SIZE 310 | DATA ITEM OFFSET 312 | RECORD NUMBER |
|---|---|---|---|---|---|
| STUDENT | STRUCTURE | 4 | 16 | 0 | 1 |
| EYECATCHER | int | 0 | 4 | 0 | 2 |
| CODE | char | 0 | 4 | 4 | 3 |
| AGE | int | 0 | 4 | 8 | 4 |
| COURSE | COURSE* | 0 | 4 | 12 | 5 |
| COURSE | STRUCTURE | 2 | 8 | 0 | 6 |
| NAME | char | 0 | 4 | 0 | 7 |
| DURATION | int | 0 | 4 | 4 | 8 |

The records of the application data description file 231 outlined in Table 8 are stored in binary format in accordance with the structure of records for the application data description file 231 outlined in Table 1. FIG. 6 is a diagram illustrating a segment of an application data description file 231 in a preferred embodiment of the present invention. The application data description file 231 of FIG. 6 is structured in accordance with the structure of FIG. 3 and Table 1 and contains the size 310, with the value "16" in hexadecimal notation ("0x00000010"); a third four byte field ranging from columns 609 to 612 corresponding to the data item offset 312, with the value "0" in hexadecimal notation ("0x00000000"); and a final four byte field ranging from columns 613 to 616 corresponding to the record number, with the value "1" in hexadecimal notation ("0x00000001"). Thus, the first record 630 corresponds to the description of the student data structure 402 in the first row of Table 8. The subsequent records 632, 634, 636 and 638 of the application data description file 231 of FIG. 6 correspond to the second, third, fourth and fifth rows of Table 8 respectively. All of the rows of Table 8 are included in the application data description file 231 in this way.

Figure 7:
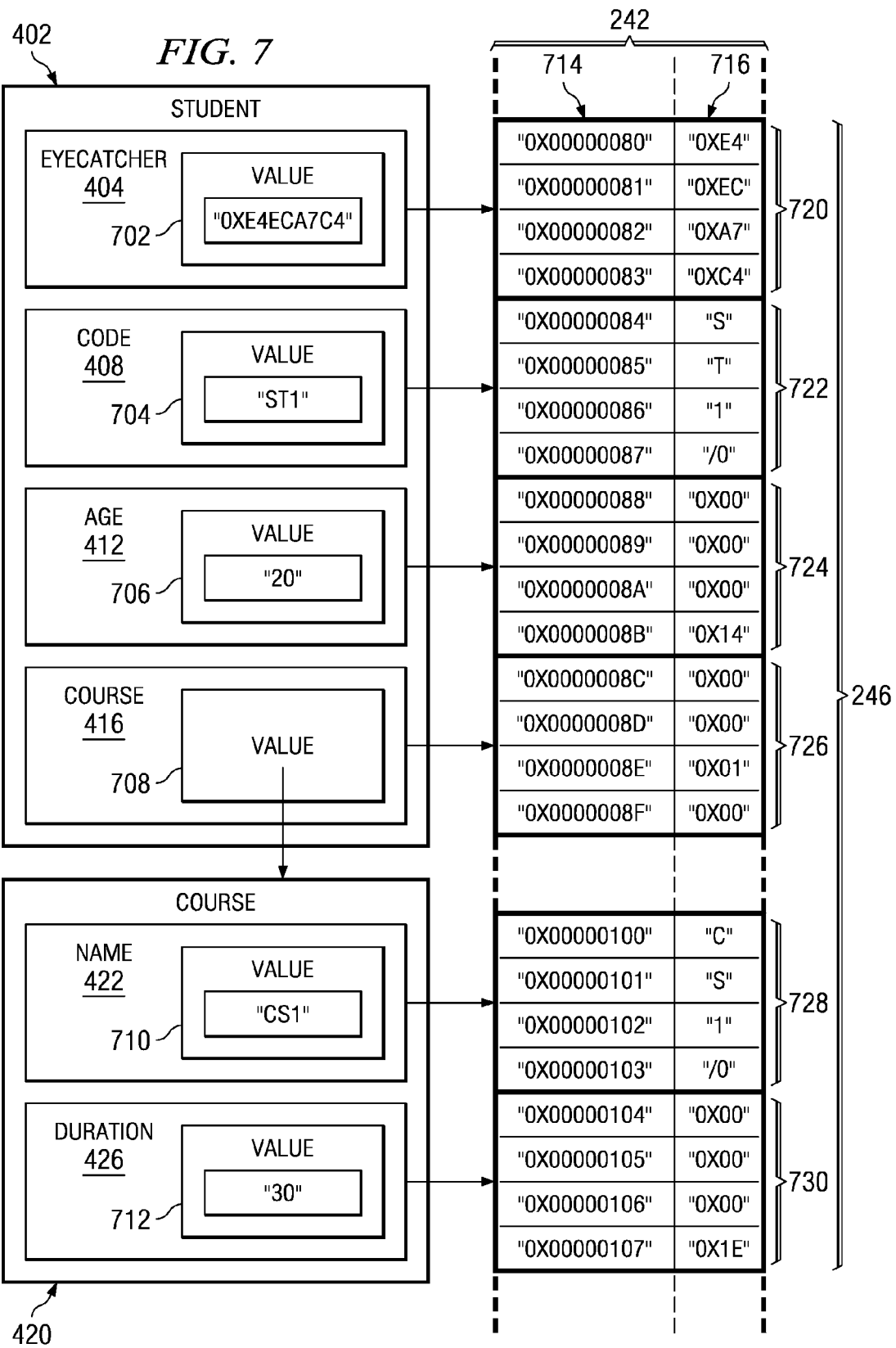
FIG. 7 illustrates an example set of application data structured in accordance with the student data structure of FIG. 4a and the course data structure of FIG. 4b in a preferred embodiment of the present invention.

The application executable 230 is executed on first computer system 240 by loading the application executable 230 into the memory 242 of first computer system 240 as application runtime 244. Application runtime 244 contains machine instructions which execute in a processor of the first computer system 240. Application runtime 244 initially loads the application data description file 231 into the memory 240 as application data description 247. The application data description 247 is byte for byte identical to the application data description file 231. Further, at runtime, the application runtime 244 generates application data 246 which is stored in memory 242. The application data 246 is data which is structured in accordance with the data structure definitions 248. FIG. 7 illustrates an example set of application data 246 structured in accordance with the student data structure 402 of FIG. 4a and the course data structure 420 of FIG. 4b in a preferred embodiment of the present invention. Each field of the student data structure 402 is given a value in the example set of application data 246 of FIG. 7. The eyecatcher field 404 has the numeric value 702 "0xE4ECA7C4" in hexadecimal. The code field 408 has the character string value 704 "ST1". The age field 412 has the numeric value 706 "20". The course field 416 contains a memory pointer value 708 to a course data structure 420. Each field of the course data structure 420 referred to by the memory pointer value 708 is also given a value in the example application data 246. The name field 422 has the character string value 720 "CS1". The duration field 426 has the numeric value 712 "30".

FIG. 7 further illustrates how the example data values for each of the fields of the student data structure 402 and the course data structure 420 are stored in the memory 242 as application data 246 in a preferred embodiment of the present invention. The memory 242 includes a sequential list of memory locations each having a memory address 714 and a byte of storage 716. In the example of FIG. 7, the data values for the fields of the student data structure 402 are stored in a block of memory locations commencing with a memory location having the hexadecimal address "0x00000080". The example data values of the student data structure 402 are stored in the memory 242 of the first computer system 240 with an PPC32 architecture in the following way. The eyecatcher value 702 of "0xE4ECA7C4" is stored in hexadecimal format in the four-byte block of memory locations indicated at 720. The code value 704 of "ST1" is stored in the four-byte block of memory locations indicated at 722. The age value 706 is stored in hexadecimal format in the four-byte block of memory locations indicated at 724. The course memory pointer value 708 is stored in the four-byte block of memory locations indicated at 726. The course memory pointer value 708 stored at memory block 726 has the value of "0x00000100" in hexadecimal. Thus, the data values for the fields of the course data structure 420 are stored in a block of memory locations commencing with a memory location having the hexadecimal address "0x00000100". The example data values of the course data structure 420 are stored in the memory 242 in the following way. The name value 710 of "CS1" is stored in the four-byte block of memory indicated at 728. The duration value 712 of "30" is stored in the four-byte block of memory indicated at 730. In this way, the example data values for each of the fields of the student data structure 402 and the course data structure 420 are stored in the memory 242 as application data 246.

During execution of the application runtime 244, the first computer system 240 generates the dump file 262 of FIG. 2. The dump file 262 can be generated in response to a request by a user of the first computer system 240, or alternatively in response to a problem in the execution of application runtime 244 such as an unrecoverable error. In the preferred embodiment, the dump file 262 is a binary file containing a sequential list of bytes 264, where each byte corresponds to one byte in memory 242 at the particular time when the dump file 262 was generated. Thus, dump file 262 is considered to be a snap-shot of all, or a subset of, the memory 242. Alternatively, the dump file 262 can be a memory dump stored in the memory of the first computer system 240, or a stream of bytes generated by the first computer system 240 and deposited on a network. The dump file 262 includes within the sequential list of bytes 264 a block of bytes 266 corresponding to the application data description 247, and a further one or more blocks of bytes corresponding to the application data 246. The application data description 247 and the application data 246 are copied to the dump file 262 on a byte by byte basis so that the dump file 262 includes a replica of the application data description 247 and the application data 246.

Figure 8:
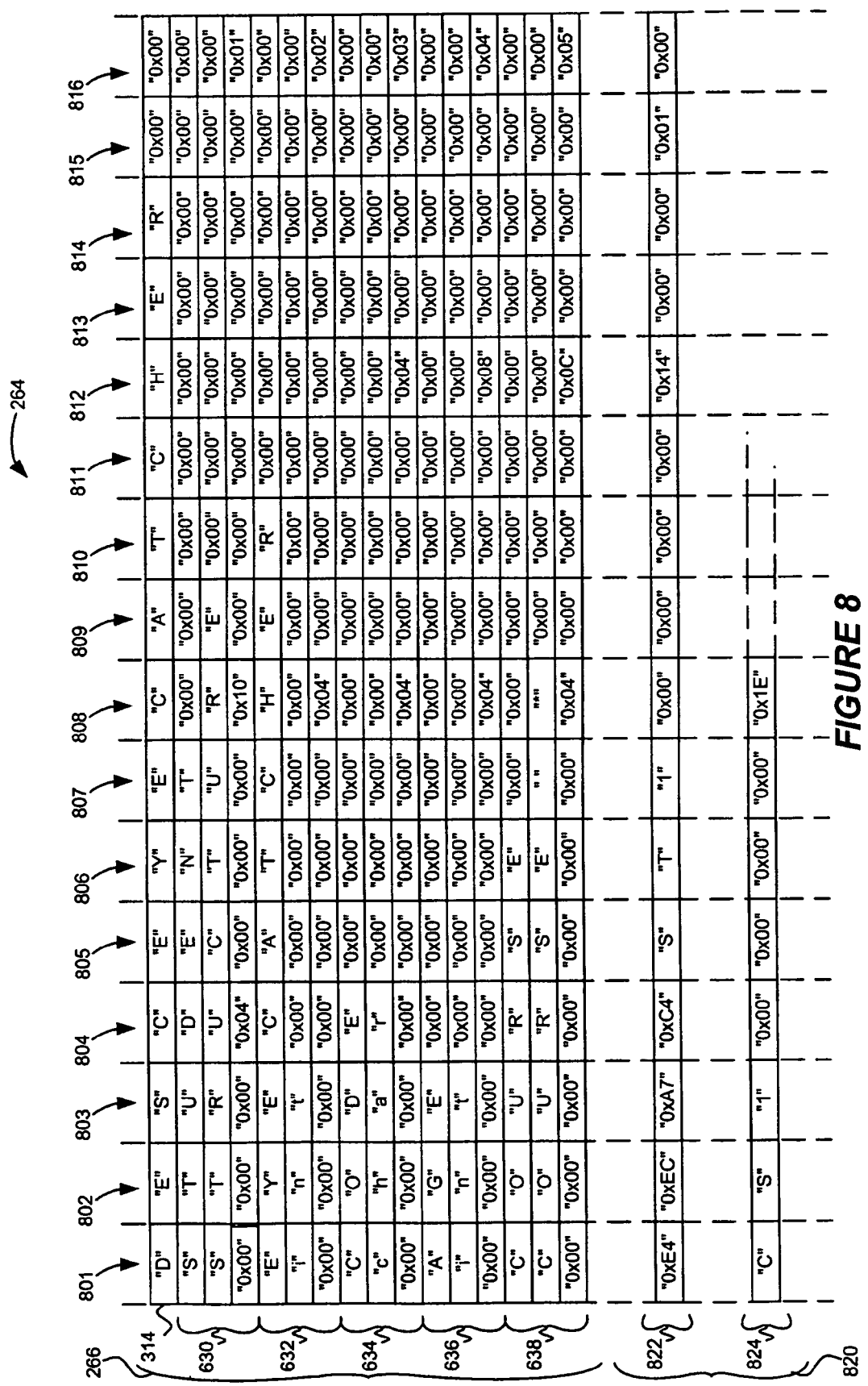
FIG. 8 is a diagram illustrating a sequential list of bytes in a segment of a dump file in a preferred embodiment of the present invention.

FIG. 8 is a diagram illustrating a sequential list of bytes 264 in a segment of a dump file 262 in a preferred embodiment of the present invention. For clarity and ease of reference, the sequential list of bytes 264 of FIG. 8 is arranged as a series of rows, each including sixteen bytes organised into columns 801 to 816. The sequential list of bytes 264 includes a block of bytes 266 corresponding to the application data description 247, and a block of bytes 820 corresponding to application data 246. The block of bytes 266 corresponding to the application data description 247 also correspond to the application data description file 231 of FIG. 6, because the application data description 247 is a byte by byte copy of the application data description file 231. Thus, the block of bytes 266 corresponding to the application data description 247 includes a first sixteen byte data description eyecatcher 314, and subsequently, a forty-eight byte block for each of the records of the application data description file 231 as described above with respect to FIG. 6.

The block of bytes 820 corresponding to application data 246 includes a first sixteen-byte block of bytes indicated at row 822 corresponding to the example data values of the student data structure 402 of FIG. 7. Row 822 is divided as follows: a first four byte field ranging from columns 801 to 804 corresponding to the eyecatcher field 404 of the student data structure 402, with the hexadecimal value 702 of "0xE4ECA7C4"; a second four byte field ranging from columns 805 to 808 corresponding to the code field 408 of the student data structure 402, with the character string value 704 of "ST1"; a third four byte field ranging from columns 809 to 812 corresponding to the age field 412 of student data structure 402, with the numeric value 706 of "20" represented in hexadecimal (as "0x00000014"); and a fourth four byte field ranging from columns 813 to 816 corresponding to the course field 416 of the student data structure, with the hexadecimal memory pointer value 708 of "0x00000100".

The block of bytes 820 corresponding to application data 246 further includes an eight-byte block of bytes indicated at partial row 824 corresponding to the example data values of the course data structure 420 of FIG. 7. Partial row 824 is divided as follows: a first four byte field ranging from columns 801 to 804 corresponding to the name field 422 of the course data structure 420, with the character string value 710 of "CS1"; and a second four byte field ranging from columns 805 to 808 corresponding to the duration field 426 of the course data structure 420, with the numeric value 712 of "30" represented in hexadecimal (as "0x0000001").

Once generated, the dump file 262 is read by the dump file analysis tool 268 on second computer system 270 of FIG. 2. The second computer system 270 can have an architecture which differs from that of the first computer system 240. The dump file analysis tool includes an application data description loader 2682 which locates and reads the block of bytes 266 from the dump file 262 corresponding to the application data description 247. Thus the dump file analysis tool 268 is able to receive a copy of the application data description 247. Subsequently, the dump file analysis tool 268 generates runtime data structures in accordance with the application data description 247 loaded by the application data description loader 2682. The runtime data structures are data structures defined at runtime in accordance with the application data description 247 for the storage of application data 246 which is also read from the dump file 262. For example, the student data structure 402 of FIG. 4a can be defined at runtime by the dump file analysis tool 268. This runtime definition of the student data structure 402 can then be used to store application data 246 which is contained within the sequential list of bytes 264 of the dump file 262. Thus, using the dump file analysis tool 268, a user or a software application is able to analyse the application data 246 corresponding to the state of the first computer system 240 at the time when the dump file 262 was generated.

Figure 9:
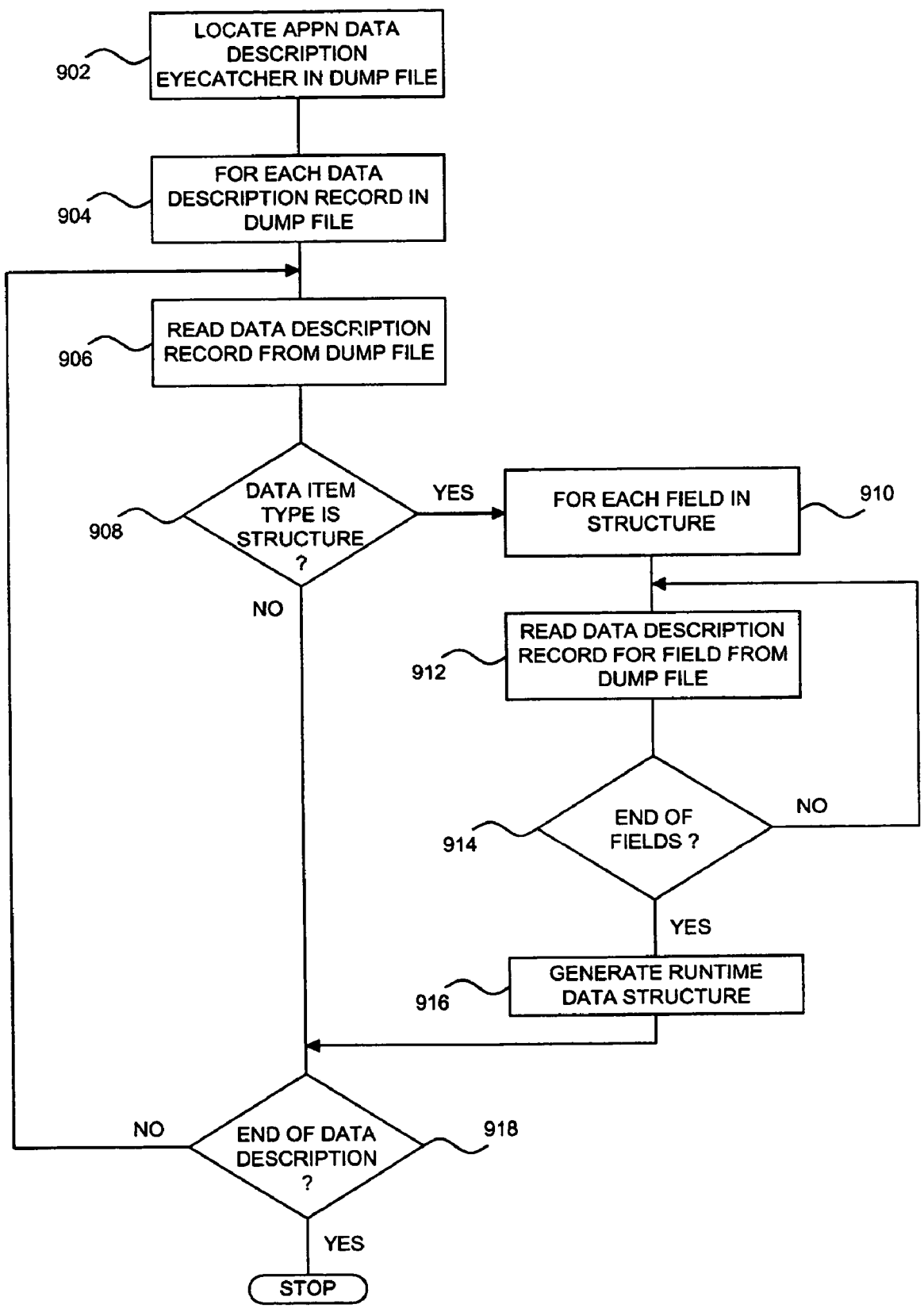
FIG. 9 is a flowchart for a method of the application data description loader of FIG. 2 in a preferred embodiment of the present invention.

FIG. 9 is a flowchart for a method of the application data description loader 2682 of FIG. 2 in a preferred embodiment of the present invention. The method reads the block of bytes 266 corresponding to the application data description 247 from the dump file 262 and generates runtime data structures accordingly. The method of FIG. 9 is considered in use below with reference to the sequential list of bytes 264 of FIG. 8. Starting at step 902, the method identifies the start of the block of bytes 266 corresponding to the application data description by searching for the value of the application data description eyecatcher field 314. Thus, the value "DESCEYECATCHER" is located to identify the start of the block of bytes 266 in the sequential list of bytes 264 of FIG. 8. Then, at step 904, a loop is initiated through each record of the application data description 247. Starting with the first record 630 of FIG. 8, at step 906 the first record 630 is read by the application data description loader 2682. The first record 630 has the following field values:

Thus the first record 630 corresponds to a definition of the student data structure 402. At step 908, the method determines that the first record 630 is a data structure definition with reference to the data item type 306 of the first record. The method then proceeds to step 910, where a loop is initiated through each field in the student data structure 402. At step 910, the method is able to determine that there are four fields in the student data structure 402 with reference to the number of fields 308 of the first record. For the first field of the structure, at step 912, the record 632 is read by the application data description loader 2682. At step 914, the loop through step 912 is repeated for all four fields of the student data structure 402 so that the application data description loader 2682 reads records 632, 634, 636 and 638 of the student data structure 402. Thus, the following records are read from block of bytes 266:

TABLE 10

| DATA ITEM NAME 304 | DATA ITEM TYPE 306 | NUMBER OF FIELDS 308 | DATA ITEM SIZE 310 | DATA ITEM OFFSET 312 | RECORD NUMBER |
| --- | --- | --- | --- | --- | --- |
| STUDENT | STRUCTURE | 4 | 16 | 0 | 1 |
| EYECATCHER | int | 0 | 4 | 0 | 2 |
| CODE | char | 0 | 4 | 4 | 3 |
| AGE | int | 0 | 4 | 8 | 4 |
| COURSE | COURSE* | 0 | 4 | 12 | 5 |

The method then proceeds to step 916, and a runtime data structure is generated in accordance with the description of Table 10. The runtime data structure is the student data structure 402 of FIG. 4a. At step 918, the method determines if there are more application data description 247 records in block of bytes 266. Although the block of bytes 266 of FIG. 8 does not include further application data description 247 records, further records describing the course data structure 420 will also be included in block of bytes 266, and would be processed by the method of FIG. 9. Thus, in this way the method of FIG. 9 reads the block of bytes 266 corresponding to the application data description 247 from the dump file 262 and generates appropriate runtime data structures for the student data structure 402 and the course data structure 420 accordingly.

Figure 10:
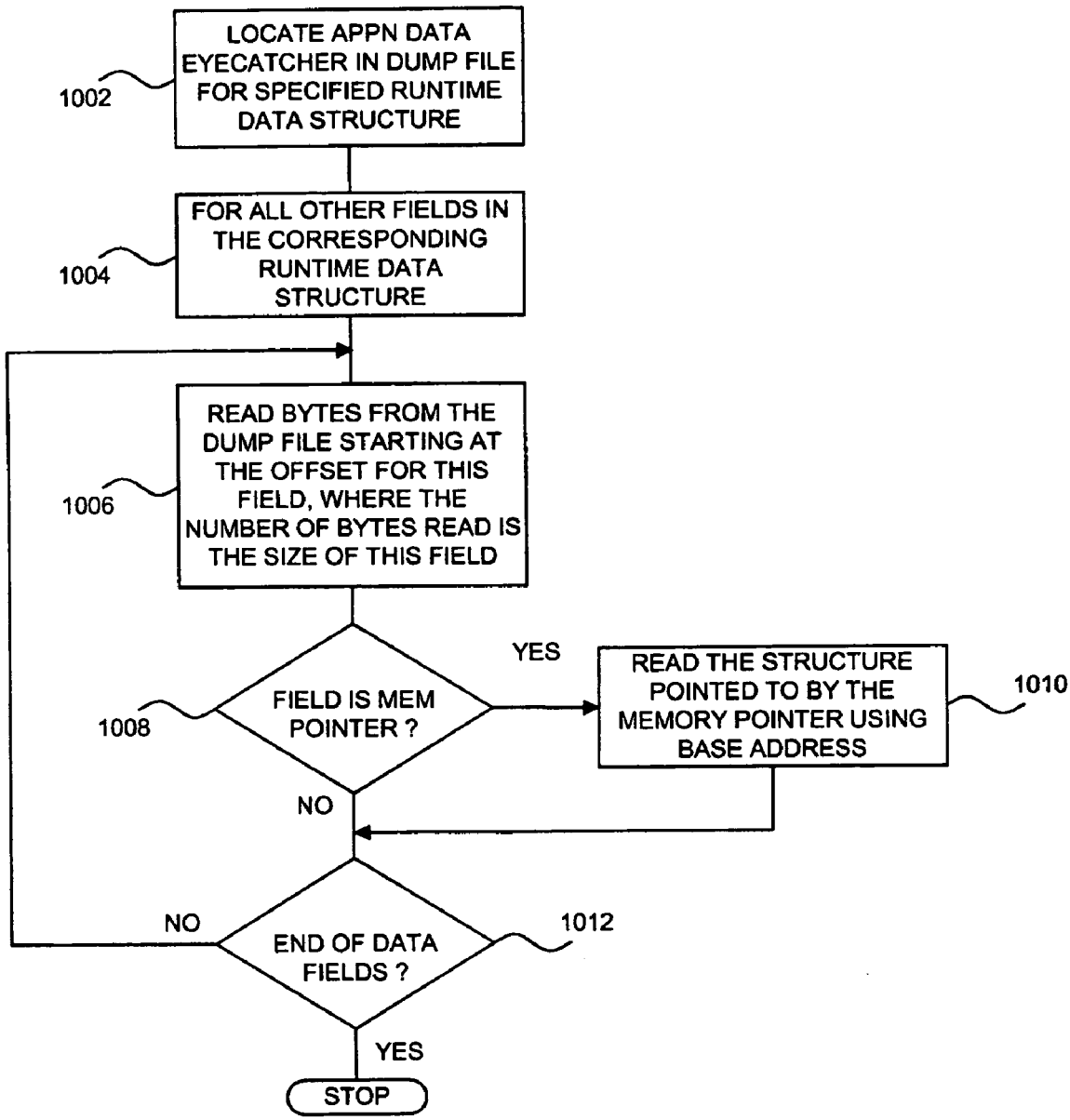
FIG. 10 is a flowchart of a method of the dump file analysis tool for reading application data from the dump file in a preferred embodiment of the present invention.

Subsequently, the dump file analysis tool 268 reads application data 246 from the sequential list of bytes 264 in the dump file 262. FIG. 10 is a flowchart of a method of the dump file analysis tool 268 for reading application data 246 from the dump file 262 in a preferred embodiment of the present invention. The method of FIG. 10 is considered in use below with reference to the sequential list of bytes 264 of FIG. 8 and the example data values for each of the fields of the student data structure 402 in FIG. 7. Starting at step 1002, the method locates an eyecatcher value for a required runtime data structure in the sequential list of bytes 264. The required runtime data structure and corresponding eyecatcher value can be supplied by a user of the dump file analysis tool 268, or alternatively these may be stored in a file or memory location on the second computer system 270. The user may specify

TABLE 9

| DATA ITEM NAME 304 | DATA ITEM TYPE 306 | NUMBER OF FIELDS 308 | DATA ITEM SIZE 310 | DATA ITEM OFFSET 312 | RECORD NUMBER |
| --- | --- | --- | --- | --- | --- |
| STUDENT | STRUCTURE | 4 | 16 | 0 | 1 | that the student data structure 402 is required, and referring to the example data values for each of the fields of the student data structure 402 in FIG. 7, the eyecatcher value 702 of "0xE4ECA7C4" may be specified. Thus, step 1002 identifies this eyecatcher value 702 in the sequential list of bytes 264 at column 801 of row 822. Then, at step 1004, the method initiates a loop through all other fields (i.e. excluding the eyecatcher field 404) of the student data structure 402, which was loaded by the application data description loader 2682 and the method of FIG. 9 described hereinabove. Referring to the fields of the student data structure 402 in FIG. 4*a*, starting with the code field 408, at step 1006 bytes are read from the sequential list of bytes 264 corresponding to a value of the code field 408. The dump file analysis tool 268 is able to determine which bytes should be read, and how many bytes should be read, by using the description of the code field 408 determined by the application data description loader 2682. This description of the code field 408 is summarised in Table 10 above, and includes a description of the size 310 of the code field, which is four bytes, and the offset 312 of the code field 408 from the beginning of the student data structure 402, which is also four bytes. Thus the method is able to determine that the code field 408 should be read as the four bytes which are offset by four bytes from the beginning of the student data structure 402. The beginning of the student data structure 402 is marked by the first byte of the eyecatcher field 404, which is at column 801 of row 822. Thus, the first byte of the code field 408 is offset by four bytes from this location, and is at column 805 of row 822. Since the code field 408 is four bytes in size, the value of the code field is stored in the four bytes of row 822 from column 805 to column 808. Thus, the value of the code field 408 is read to be "ST1". Subsequently, at step 1008, it is determined that the code field 408 is not a memory pointer and the method proceeds to step 1012 where the loop proceeds to the next field in the student data structure 402. For a memory pointer field, such as the course field 416 of the data structure 402, a further processing step is required at step 1010. Step 1010 loads a data structure corresponding to the memory location referenced by the memory pointer field. For example, the course field 416 is stored in row 822 columns 813 to 816 and has the value "0x00000100" in hexadecimal. Thus, at step 1010 the course data structure 420 referenced by the course field 416 is located and loaded. The referenced course data structure 420 can be easily located by converting the memory pointer of the course field 416 into a reference to a byte within the sequential list of bytes 264. One way this can be achieved is through the use of the base address 265. Once the course data structure 420 has been located, steps 1004 through 1012 of FIG. 10 can be used to read values of the course data structure 420 fields. In this way, a block of bytes corresponding to the application data 246 in the sequential list of bytes 264 can be located and read by the dump file analysis tool 268 using the block of bytes 266 corresponding to the application data description 247.

Figure 11:
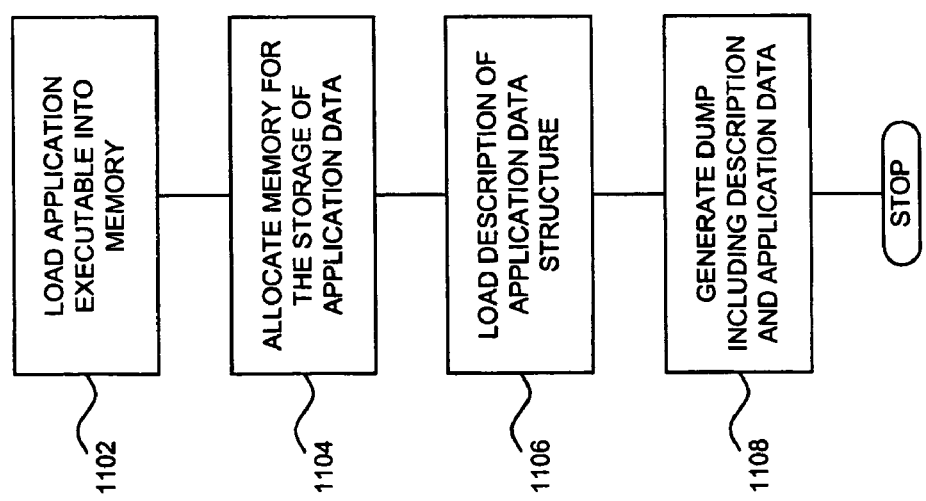
FIG. 11 is a flowchart illustrating a method for generating the dump of the memory in a preferred embodiment of the present invention.

FIG. 11 is a flowchart illustrating a method for generating the dump 262 of the memory 242 in a preferred embodiment of the present invention. At step 1102, the application executable 230 is loaded into the memory 242 of the computer system 240 for execution as application runtime 244. At step 1104, the application runtime 244 allocates memory 242 of the computer system 240 for the storage of application data 246. At step 1106, the application runtime 244 loads the application data description file 231 into the memory 242 as application data description 247. And finally at step 1108, a dump 262 of the memory 242 is generated including the application data description 247 and the application data 246.

Figure 12:
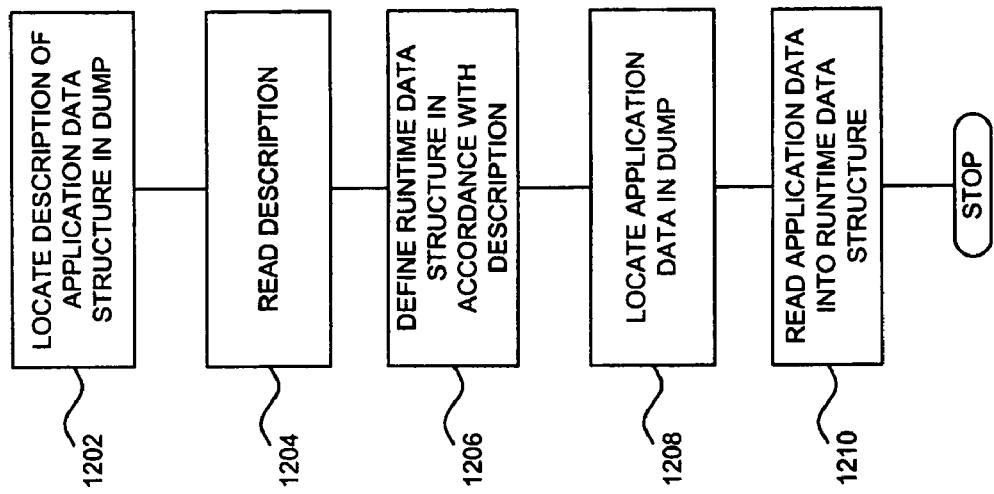
FIG. 12 is flowchart illustrating a method for reading the dump of the memory in a preferred embodiment of the present invention.

FIG. 12 is flowchart illustrating a method for reading the dump 262 of the memory 242 in a preferred embodiment of the present invention. At step 1202, the block of bytes 266 corresponding to the application data description 247 is located in the dump 262. At step 1204, the block of bytes 266 corresponding to the application data description 247 are read from the dump 262. At step 1206, a runtime data structure is defined in accordance with the application data description 247. At step 1208, application data 246 is located within the dump 262 and at step 1210 the application data 246 is read into the runtime data structure.

In particular, the range of bytes 266 corresponding to the application data description 247 includes a definition of particular offsets and sizes for fields in data structures within application data 246. Thus the dump file analysis tool 268 is able to accurately locate and read application data 246 within the dump file 262 without reference to the data structure definitions in the header file 236. Furthermore, the definition of particular offsets and sizes for fields allows the dump file 262 to be accurately read by a dump file analysis tool 268 running on the computer system 270 with any architecture. Thus, the dump file 262 can be considered to be platform independent.

Additionally, the application data description 247 originates as an application data description file 231 and is generated for a particular application executable 230 based on the header file 236 used to compile the application executable 230. Thus, if the application data description file 231 is provided along with the application executable 230 as part of a production system, the appropriate application data description 247 is always loaded into the memory 242 of the first computer system 240, and consequently is always included in the dump file 262. Thus, the dump file analysis tool 268 will always be able to obtain a platform independent description of the application data 246 regardless of the availability of the header file 236.

It will be appreciated that the implementation of the invention as described in the foregoing is merely illustrative of the invention and is not to be considered as limitative with respect to its scope.

The invention claimed is:

1. A method for generating a memory dump of a memory of a computer system, comprising the steps of:

loading an application executable into the memory of the computer system for execution as an application runtime;

the application runtime allocating memory of the computer system for the storage of application data;

the application runtime loading a description of a structure of the application data into the memory of the computer system, wherein the description of a structure of the application data is stored in a binary format and includes one or more data item descriptions, and wherein each of the one or more data item descriptions include a data item name that is a character representation of a name of a data item, a data item type that is a representation of a name of a type of a data item, a number of fields that is a numeric value corresponding to a number of data fields within a data item, a data item size that is a numeric value corresponding to a size of a data item measured in bytes or bits to accommodate a variable size of the data item, and a data item offset that is a numeric value corresponding to an offset of a data item from a beginning of a data structure containing the data item; and the computer system generating a memory dump of the memory of the computer system, said memory dump including the description and the application data.

2. The method of claim 1 wherein the description of a structure of the application data is platform independent.

3. The method of claim 1 wherein the description of a structure of the application data includes an eyecatcher field.

4. The method of claim 1 wherein the application data includes an eyecatcher field.

5. The method of claim 1 wherein the memory dump is stored in a file.

6. The method of claim 1 wherein the application data is defined using a data structure.

7. A method for reading a memory dump of a memory of a computer system, comprising the steps of:

locating a description of a structure of application data in the memory dump, wherein the description of a structure of the application data is stored in a binary format and includes one or more data item descriptions, and wherein each of the one or more data item descriptions include a data item name that is a character representation of a name of a data item, a data item type that is a representation of a name of a type of a data item, a number of fields that is a numeric value corresponding to a number of data fields within a data item, a data item size that is a numeric value corresponding to a size of a data item measured in bytes or bits to accommodate a variable size of the data item, and a data item offset that is a numeric value corresponding to an offset of a data item from a beginning of a data structure containing the data item;

reading said description;

defining a runtime data structure in accordance with the description;

locating application data in the memory dump; and reading said application data into said runtime data structure.

8. The method of claim 7 wherein the description of a structure of the application data includes an eyecatcher field.

9. The method of claim 8 wherein said locating a description step includes locating the eyecatcher field.

10. The method of claim 7 wherein the application data includes an eyecatcher field.

11. The method of claim 10 wherein said locating application data step includes locating the eyecatcher field.

12. The method of claim 7 wherein the description of a structure of the application data is platform independent.

13. The method of claim 7 wherein the memory dump is stored in a file.

* * * * *